No. 635,453. Patented Oct. 24, 1899.
S. H. WELLER.
BICYCLE GEARING.
(Application filed Nov. 7, 1898.)
(No Model.)
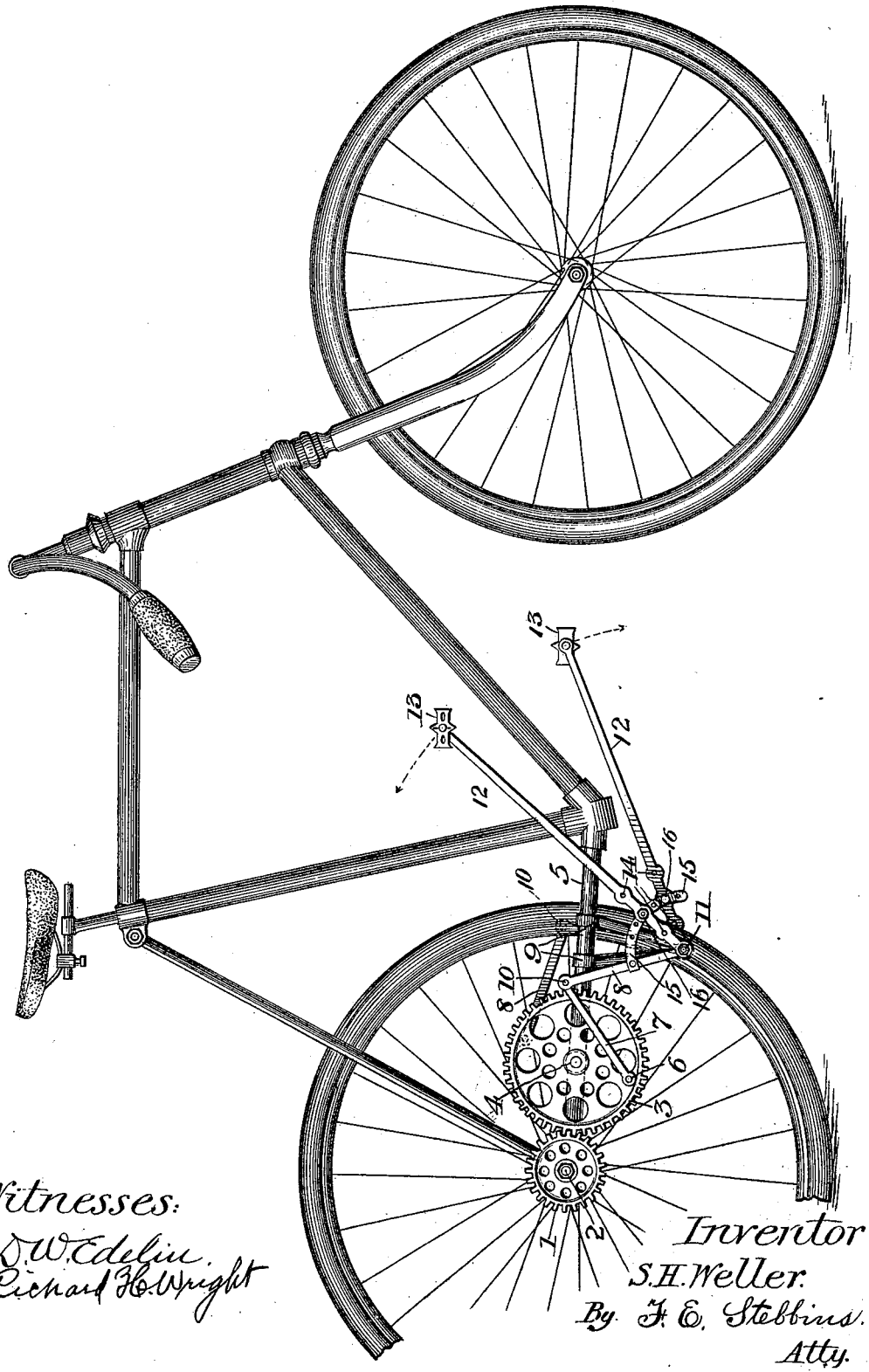
Witnesses:
D. W. Edelin
Richard H. Wright
Inventor
S. H. Weller.
By F. E. Stebbins.
Atty.
THE NORRIS PETERS CO., PHOTO-LITHO., WASHINGTON, D. C.

UNITED STATES PATENT OFFICE.

SAMUEL H. WELLER, OF BUTTE, MONTANA.

BICYCLE-GEARING.

SPECIFICATION forming part of Letters Patent No. 635,453, dated October 24, 1899.

Application filed November 7, 1898. Serial No. 695,692. (No model.)

*To all whom it may concern:*

Be it known that I, SAMUEL H. WELLER, a citizen of the United States, residing at South Butte, in the county of Silver Bow and State of Montana, have invented certain new and useful Improvements in Bicycle-Gearing, of which the following is a specification.

The object of my invention is the production of an improved gearing for the propulsion of bicycles which shall be simple in construction, cheap in first cost, durable, easily operated and controlled, which shall reduce the foot-travel and admit of adjustment, so as to adapt the same for different grades of the roadway, and which shall, withal, obviate the numerous objections appertaining to cycle-gearings heretofore devised.

My invention consists in certain novelties of construction and combinations of parts hereinafter described, and specifically pointed out in the claims.

The accompanying drawing illustrates an example of the physical embodiment of my invention. The gearing is in duplicate, one set being applied each side of the rear wheel. One full gear is shown in elevation view and the lever and pitman of the complementary set, which is disposed on the opposite side of the wheel.

The numeral 1 designates a gear-wheel.

2 is an axle upon which the gear-wheel 1 is mounted in a fixed position, so that both the wheel and axle will revolve together.

3 is a gear-wheel having a stub-shaft 4 supported in a bearing located on the rear fork 5 of the frame.

6 is a pin connecting the pitman 7 to the gear-wheel.

8 is the short arm of a reciprocating lever pivoted to the pitman 7 at one end and connected at the opposite end with an oscillating bearing-shaft 11. This shaft is journaled in a bearing affixed to the lower end of the supporting-frame 9, which is rigidly secured to the fork. The numeral 12 designates the long arm of a lever which is also affixed to the shaft 11 and carries upon its free end a pedal 13 of any suitable construction.

14 are perforated bearings.

15 is an adjusting-arc having a series of holes, as shown, and 16 a removable bolt.

The bearings, arc, and bolt provide for the adjustment of the lever-arm 12 longitudinally and also in a vertical plane. To adjust it longitudinally, the nuts on shaft 11 and on bolt 16 are removed, the holes 14 in the lever-arm caused to register with the shaft 11 and the bolt 16, and then the nuts are replaced. This shortens the lever-arm 12. To adjust it in a vertical plane, the nut on bolt 16 is removed, the bolt withdrawn, the lever-arm shifted to register with one of the holes in the arc 15, and then the bolt 16 and nut are adjusted to secure the lever-arm in its changed position relative to the arc.

The operation of the gearing in the propulsion of the bicycle is obvious and need not be described.

From the foregoing it will be seen that I have devised an improved means for the transmission of power to the rear wheel, and which possesses many novel and characteristic features, and whereby are attained the following advantages, to wit: the elimination of the pedal-crank and chain and the substitution of a reciprocating for the rotary motion of the ordinary pedal-crank, the reduction of the foot travel in pedaling, the provision of means for increasing the leverage on upgrades of the roadway, and the possibility of a better control of the machine on a graded as well as on a level road.

Modifications can of course be made in the specific form of the gearing illustrated, the lever made integral, and equivalents substituted for the several elements and my invention still be embodied. All such changes I intend to embrace within the scope of my claims when the same incorporate the *modus operandi* of my gearing.

What I claim as new, and desire to secure by Letters Patent of the United States, is—

1. A bicycle-gearing consisting of the following elements in combination, to wit: toothed wheels on the rear axle; toothed wheels mounted on the rear forks; pitmen; short lever-arms and long lever-arms secured to the bearing-shafts and also united by adjusting-arcs having perforations; and pedals on the long lever-arms; said long lever-arms being adjustable longitudinally through the medium of the perforations 14, bolt 16 and shaft 11, whereby the leverage may be increased or diminished; in substance as set forth.

2. A bicycle-gearing consisting of the following elements in combination, to wit: toothed wheels on the rear axle; toothed wheels mounted on the rear forks; pitmen; short lever-arms and long lever-arms secured to the bearing-shafts and also united by adjusting-arcs having perforations; and pedals on the long lever-arms; each long lever-arm being adjustable in a vertical plane through the medium of the perforated arc 15, the holes 14, and the bolt 16; in substance as set forth.

In testimony whereof I affix my signature in presence of two witnesses.

SAML. H. WELLER.

Witnesses:
   RICHARD H. WRIGHT,
   F. H. GWYNNE.